US012692704B2

(12) United States Patent
Sorkin

(10) Patent No.: US 12,692,704 B2
(45) Date of Patent: Jul. 28, 2026

(54) BAR SUPPORT AND METHOD OF MAKING A BAR SUPPORT

(71) Applicant: Felix Sorkin, Stafford, TX (US)

(72) Inventor: Felix Sorkin, Stafford, TX (US)

(73) Assignee: Felix Sorkin, Stafford, TX (US)

( * ) Notice: Subject to any disclaimer, the term of this patent is extended or adjusted under 35 U.S.C. 154(b) by 0 days.

(21) Appl. No.: 19/074,691

(22) Filed: Mar. 10, 2025

(65) Prior Publication Data

US 2025/0207397 A1     Jun. 26, 2025

Related U.S. Application Data

(62) Division of application No. 17/222,265, filed on Apr. 5, 2021.

(60) Provisional application No. 63/006,582, filed on Apr. 7, 2020.

(51) Int. Cl.
    *B29C 45/14*        (2006.01)
    *E04C 5/20*        (2006.01)

(52) U.S. Cl.
    CPC .......... *E04C 5/20* (2013.01); *B29C 45/14065* (2013.01)

(58) Field of Classification Search
    CPC ..... E04C 5/20; B29C 45/14; B29C 45/14065; B29C 2045/14049; B29C 45/14377
    See application file for complete search history.

(56) References Cited

U.S. PATENT DOCUMENTS

| | | | |
|---|---|---|---|
| 3,338,018 A | 8/1967 | Mess, Jr. | |
| 4,000,591 A * | 1/1977 | Courtois | ............... E04G 21/142 52/707 |

| | | | |
|---|---|---|---|
| 4,483,119 A | 11/1984 | Hernandez | |
| 4,756,641 A | 7/1988 | Hartzheim | |
| 4,835,933 A | 6/1989 | Yung | |
| 5,555,693 A | 9/1996 | Sorkin | |
| 5,595,039 A | 1/1997 | Lowery | |
| 5,664,390 A | 9/1997 | Sorkin | |
| D388,312 S | 12/1997 | Sorkin | |
| 5,791,095 A | 8/1998 | Sorkin | |
| 6,089,522 A | 7/2000 | Haslem et al. | |
| 6,557,317 B2 | 5/2003 | Sorkin | |
| D480,291 S | 10/2003 | Sorkin | |
| D482,262 S | 11/2003 | Sorkin | |
| 6,684,594 B1 | 2/2004 | Sorkin | |
| 6,684,595 B1 | 2/2004 | Sorkin | |
| 6,772,571 B1 | 8/2004 | Sorkin | |
| 6,775,954 B1 | 8/2004 | Sorkin | |

(Continued)

FOREIGN PATENT DOCUMENTS

| | | | |
|---|---|---|---|
| CA | 2294541 A1 | 12/1998 | |
| CN | 211279530 U * | 8/2020 | ............. B29C 45/26 |

(Continued)

OTHER PUBLICATIONS

CN211279530U English translation prepared Jul. 23, 2025.*

(Continued)

*Primary Examiner* — John J DeRusso
*Assistant Examiner* — Shibin Liang
(74) *Attorney, Agent, or Firm* — Ervin Cohen & Jessup LLP

(57) ABSTRACT

A rebar support chair having a chair body including a plurality of conjoined legs, the conjoined legs defining a receiving area and a foot affixed to at least one leg.

9 Claims, 4 Drawing Sheets

(56) References Cited

U.S. PATENT DOCUMENTS

| | | | |
|---|---|---|---|
| D495,504 S | 9/2004 | Sorkin |
| D497,055 S | 10/2004 | Sorkin |
| D500,665 S | 1/2005 | Sorkin |
| D504,805 S | 5/2005 | Sorkin |
| D543,836 S | 6/2007 | Sorkin |
| 7,237,367 B1 | 7/2007 | Sorkin |
| 7,284,354 B1 | 10/2007 | Sorkin |
| 7,322,158 B1 | 1/2008 | Sorkin |
| D567,634 S | 4/2008 | Sorkin |
| 7,373,764 B1 | 5/2008 | Sorkin |
| D578,379 S | 10/2008 | Sorkin |
| D578,870 S | 10/2008 | Sorkin |
| 7,461,491 B1 | 12/2008 | Sorkin |
| 7,506,482 B2 | 3/2009 | Sorkin |
| D595,117 S | 6/2009 | Sorkin |
| 7,669,381 B1 | 3/2010 | Sorkin |
| D621,239 S | 8/2010 | Sorkin |
| 7,845,136 B1 | 12/2010 | Sorkin |
| 7,870,703 B1 | 1/2011 | Sorkin |
| 9,121,177 B1 | 9/2015 | Sorkin |
| D889,940 S | 7/2020 | Gilner et al. |
| 11,634,909 B2 | 4/2023 | Cramer |
| 2003/0197108 A1 | 10/2003 | Domizio |
| 2005/0210816 A1 | 9/2005 | Kelly et al. |
| 2007/0193189 A1 | 8/2007 | Bennett et al. |
| 2011/0214381 A1 | 9/2011 | Alfonso |
| 2013/0125498 A1 | 5/2013 | Lowery |
| 2015/0075110 A1 | 3/2015 | Golledge et al. |
| 2019/0136534 A1 | 5/2019 | Verelli et al. |
| 2019/0390460 A1 | 12/2019 | Verelli et al. |

FOREIGN PATENT DOCUMENTS

| | | | |
|---|---|---|---|
| DE | 1609818 A1 | 4/1970 |
| EP | 0541880 B1 | 9/1996 |

OTHER PUBLICATIONS

Extended Search Report in European Application No. 21166980.9 dated Sep. 1, 2021, 10 pages.
Communication Pursuant to Artile 94(3) EPC dated Oct. 10, 2023 issued in EP 21166980.9.

\* cited by examiner

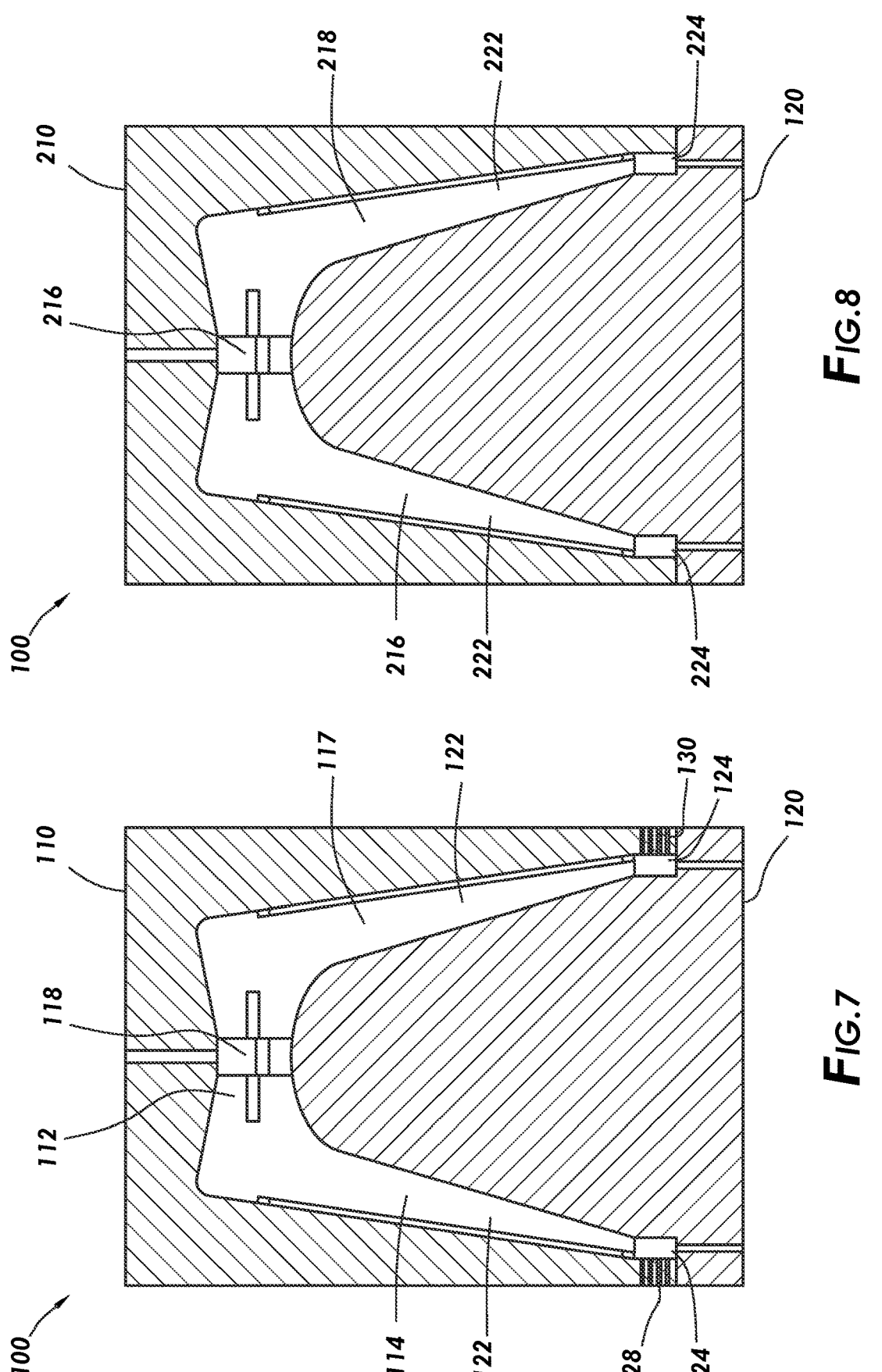
*F*IG.7
*F*IG.8

BAR SUPPORT AND METHOD OF MAKING A BAR SUPPORT

CROSS-REFERENCE TO RELATED APPLICATION

The application is a Divisional application of U.S. patent application Ser. No. 17/222,265 filed Apr. 5, 2021, that claims priority from U.S. Provisional application No. 63/006,582, filed Apr. 7, 2020, the complete disclosures of which is hereby incorporated by reference.

TECHNICAL FIELD/FIELD OF THE DISCLOSURE

The present disclosure relates to bar supports, also known as chairs, spacers and bolsters, to support post-tension cables, rebars, or mesh. The present disclosure also relates to a method of making bar supports.

BACKGROUND OF THE DISCLOSURE

In construction of a concrete slab, cables, rebars, or mesh may be embedded in the concrete so as to enhance the performance of the resulting slab. To maintain the cables, rebars, and mesh at a desired position within the slab, chairs may be used to support the cables, rebars, or mesh above a surface. Chairs may be used in poured decks, precast work, and slab-on-grade applications. A chair will include a receiving area that receives and supports the cable, or rebar, or mesh and a base that rests on the deck or grade. When the concrete is poured, the chair supports the cable, or rebar, or mesh a proper distance above the bottom surface of the slab.

In some applications, it may be desirable to provide support for an additional rebar that is not parallel to the first rebar. In some applications, it may be desirable to place more than one rebar into the receiving area of the chair. To this end, a chair may include one or more additional bar supports.

Bar supports are traditionally made via injection molding. The manufacture of bar supports having "feet" has required a separate mold for each size or height of bar support. Feet typically hold the chair in place by providing frictional contact with the surface. Each mold can cost as much as $300,000. Therefore, to manufacture different sizes of bar supports requires a capital substantial investment. There are often multiple styles of bar supports, each having multiple heights. The initial capital investment for injection molds for just one style of bar support could be more than $5,000,000. Further, each mold has a limited life, so the capital expenses often repeat. In addition to capital expenses, changing out injection molds includes additional costs in stopped manufacture and labor costs.

SUMMARY

A rebar support chair is disclosed. The rebar support chair includes a chair body including a plurality of conjoined legs, the conjoined legs defining a receiving area and a foot affixed to at least one leg. A mold for a rebar support chair is disclosed. The mold includes a mold cavity, the mold cavity includes a receiving area portion and a plurality of leg portions, wherein the leg portions are in fluid communication with the receiving area portion, each of the leg portions having a tapered section portion and a vertical section portion. The mold cavity also includes one or more pin receiving areas positioned within each vertical section portion. In addition, the mold includes a mold core.

A method of forming a rebar support chair is disclosed. The method includes providing a mold for a rebar support chair. The mold includes a mold cavity, the mold cavity includes a receiving area portion and a plurality of leg portions, wherein the leg portions are in fluid communication with the receiving area portion, each of the leg portions having a tapered section portion and a vertical section portion. The mold cavity also includes one or more pin receiving areas positioned within each vertical section portion. In addition, the mold includes a mold core. The method also includes positioning a pin within the pin receiving area of each vertical section portion, clamping the mold cavity to the mold core, and injecting melted raw plastic into the mold.

BRIEF DESCRIPTION OF THE DRAWINGS

In the accompanying figures, various features are not drawn to scale. The dimensions of certain features may be arbitrarily increased or reduced for clarity of discussion.

FIG. 7 is cutaway view of a mold cavity consistent with at least one embodiment of the present disclosure.

FIG. 8 is a cutaway view of a mold core consistent with at least one embodiment of the present disclosure.

DETAILED DESCRIPTION

Figures 1, 2:
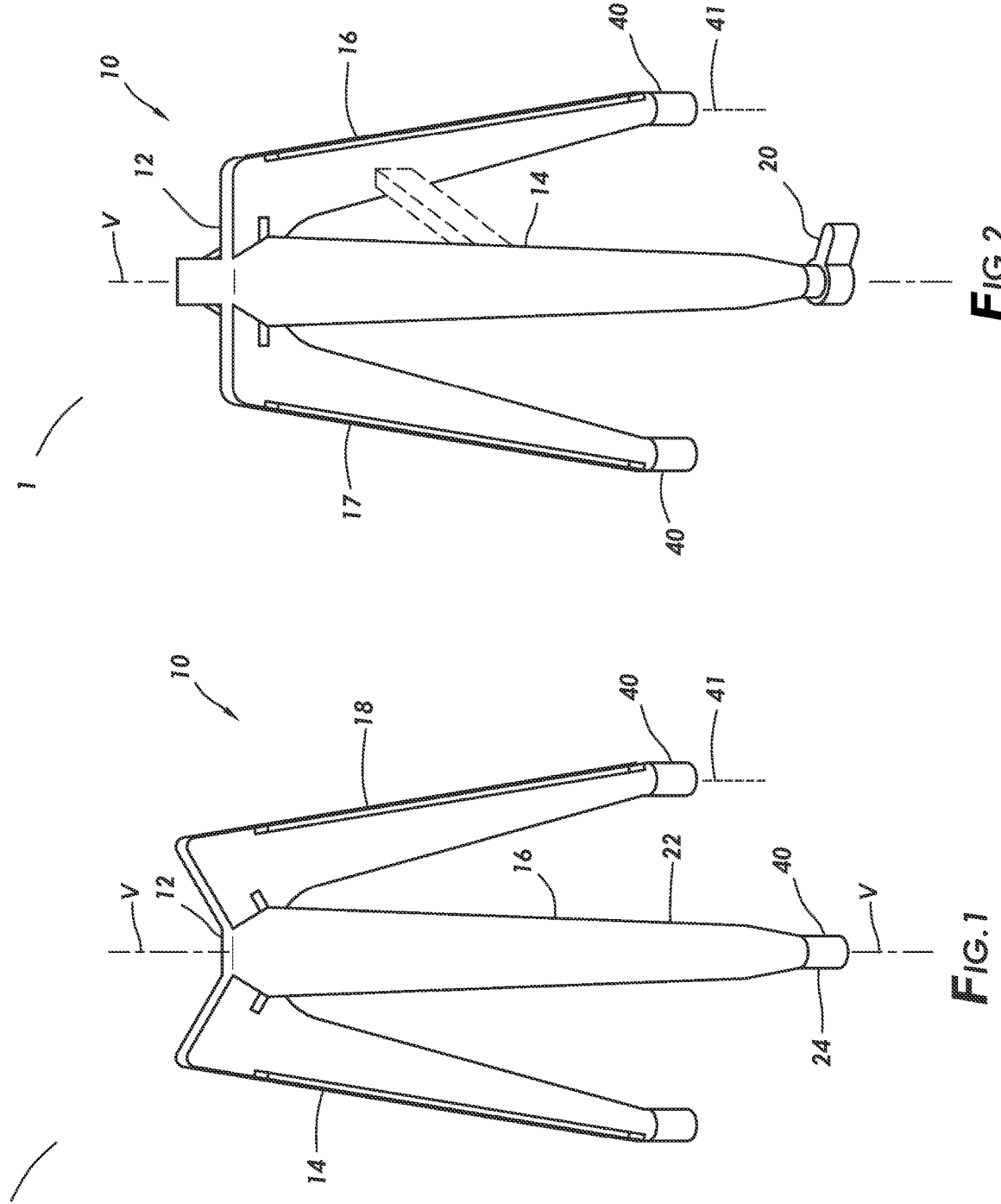
FIG. 1 is a first side view of a chair body according to an embodiment of the present disclosure.
FIG. 2 is a second side view of the chair body of FIG. 1 with a foot affixed to one leg of the chair body.

The following disclosure provides many different embodiments, or examples, for implementing different features of various embodiments. Specific examples of components and arrangements are described below to simplify the present disclosure. These are merely examples and are not limiting. In addition, the present disclosure may repeat reference numerals or letters in the examples. This repetition is for the purpose of simplicity and clarity and does not in itself dictate a relationship between the various embodiments and/or configurations discussed.

Chair

Figures 3, 4:
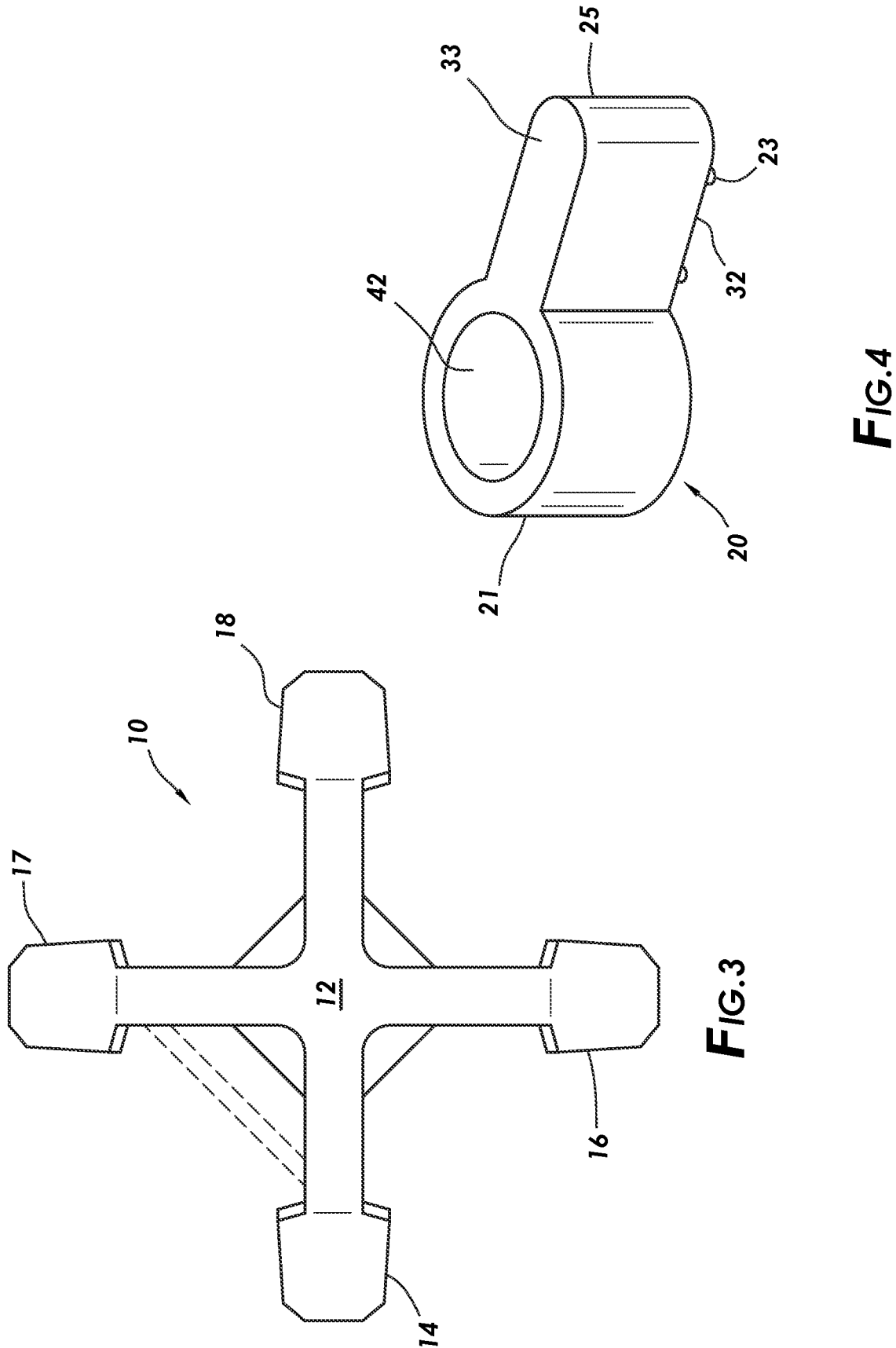
FIG. 3 is a top view of a chair body of the chair body of FIG. 1.
FIG. 4 is a perspective view of a foot according to an embodiment of the present disclosure.

In the embodiment depicted in FIGS. 1-3, rebar support chair 1 includes chair body 10 and feet 20. Chair body 10 may include at least a plurality of legs 14, 16, 17, and 18. Legs 14, 16, 17, and 18 may be conjoined at their upper ends. The junction of the conjoined legs may define a receiving area 12 and legs 14, 16, 17, and 18 may extend downwardly from the receiving area 12. As illustrated in FIG. 2 and discussed in detail below, at least one leg may have foot 20 affixed thereto. In some embodiments, foot 20 may extend substantially horizontally outwardly from the bottom of each leg 14, 16, 17, and 18. Legs 14, 16, 17, and 18 may be separate from each other below the receiving area 12. Each of legs 14, 16, 17, and 18 may include tapered section 22 and vertical section 24. Tapered section 22 may vary in width or diameter along the leg and my extend at an acute angle from receiving area 12. By contrast, vertical section 24 is vertical or near vertical.

In some embodiments, the lower end of each leg 14, 16, 17, 18 may terminate in a leg pin 40. Each leg pin 40 may be substantially cylindrical and may have a pin axis 41 that is substantially parallel to longitudinal axis V. In such embodiments, each pin may not be parallel to its associated leg.

In some embodiments, chair body 10 may be molded from a polymeric material. By way of example only, chair body 10 may comprise a glass-filled nylon material. Feet 20 may be molded from a polymeric material that is the same as or different from the material of chair body 10.

Referring now to FIG. 4, each foot 20 may have a bottom surface 32 and a top surface 33. In some embodiments, the bottom surface of one or all of the feet 20 may include one or more friction features 23 that increase friction between the foot and the surface on which it rests. Friction features 23 may include any one or more of ridges, bosses, spikes, or other friction-increasing features. In some embodiments, when the chair is loaded via receiving area 12, the friction features 23 will bite, engage, or become embedded in the surface upon which the chair body 10 is placed. By resisting movement of the feet 20 along the supporting surface, friction features 23 increase the ability of chair body 10 to resist deformation under the presence of a load.

Feet 20 may be manufactured separately from chair body 10 and affixed to chair body 10. In the embodiment illustrated in FIG. 4, each foot 20 includes a pin end 21 and a toe 25. Pin end 21 may include receptacle 42. Receptacle 42 may be sized and configured to receive a leg pin 40. Feet 20 may be mechanically coupled to each of legs 14, 16, 17, and 18 by means of friction fit, snap-fit, bayonet connection, adhesive, threads, welding (thermal, sonic, or other), or any other method.

Method of Chair Construction

In certain embodiments of the present disclosure, chair body 10 may be manufactured separately from feet 20. Feet 20 may then be affixed to legs 14, 16, 17, and 18 of chair body 10. By separate manufacture, the length of legs 14, 16, 17, and 18 may be varied in a single injection molding process as compared to traditional processes where each leg length with an affixed foot must be made in a different injection molded process.

In certain embodiments, Chair body 10 may be manufactured by an injection molding process. In the injection molding process, raw plastic material may be melted in an injection molding machine. The melted raw plastic may be injected into mold 100 where the melted raw plastic material cools and solidifies into chair body 10.

Figures 5, 6:
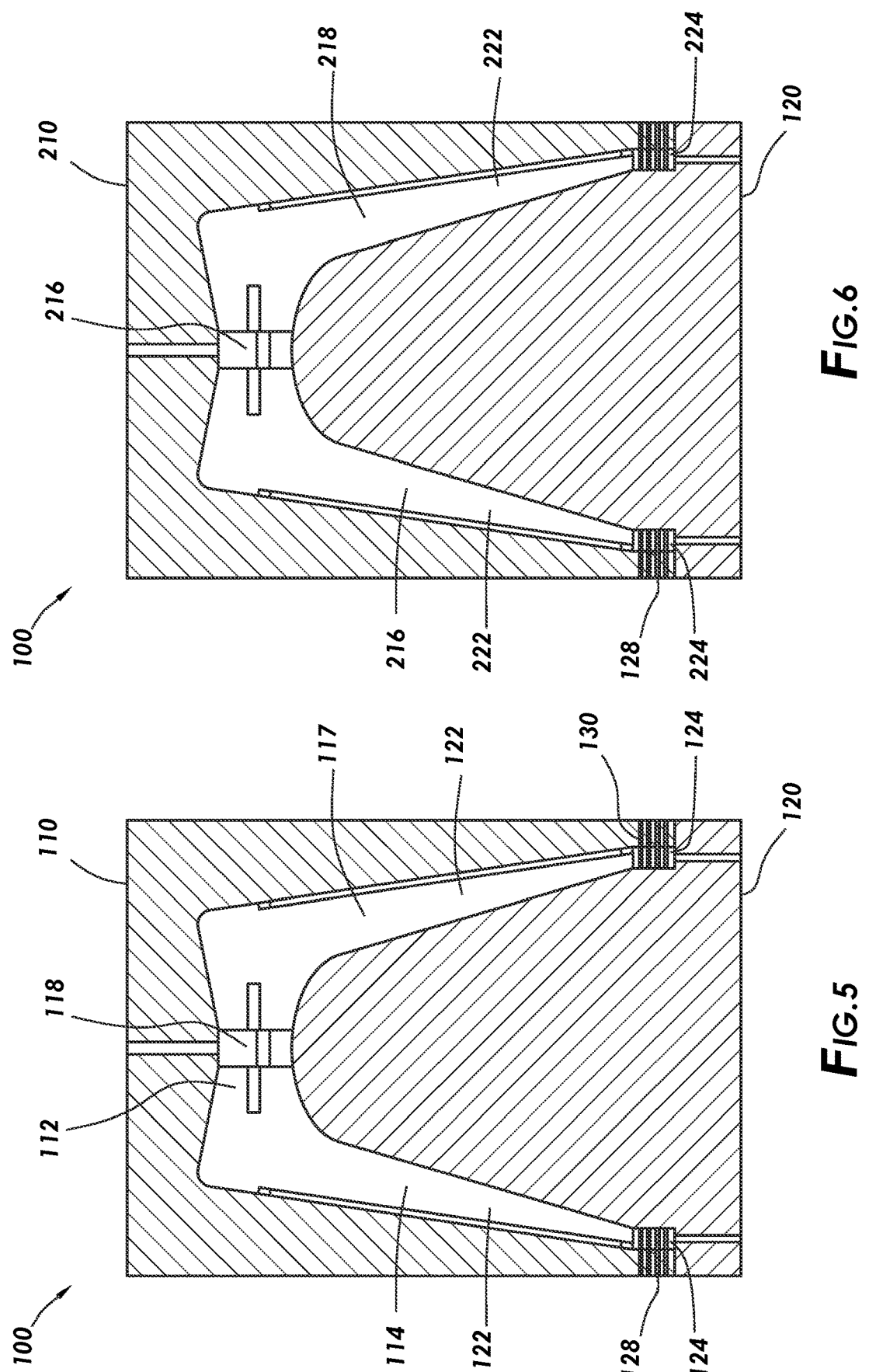
FIG. 5 is cutaway view of a mold cavity consistent with at least one embodiment of the present disclosure.
FIG. 6 is a cutaway view of a mold core consistent with at least one embodiment of the present disclosure.

As shown in FIGS. 5 and 6, mold 100 may include mold cavity 110 and mold core 120. In the injection molding process, mold cavity 110 and mold core 120 are clamped together before the melted raw plastic is injected into mold 100. Mold cavity 110 may include receiving area portion 112 and leg portions 114, 116, 117, and 118 in fluid communication that form the raw melted plastic into legs 14, 16, 17, and 18. Each of leg portions 114, 116, 117, and 118 may include tapered section portion 122 and vertical section portion 124. Mold core 210 may include corresponding leg portions 214, 216, 217, and 218, along with tapered section portion 222 and vertical section portion 224. In certain embodiments, each vertical section portion 124 of each leg portion 114, 116, 117, 118 may include one or more pin receiving areas 128. In certain embodiments, pin receiving area 128 is an indent or slot in vertical section portion 124 and is adapted to hold pin 130. Pin 130 may be any flat or curved element that prevents melted raw plastic from flowing past pin 130 in vertical section portion 124 as mold cavity 110 is filled. By selecting a pin receiving area 128, the length of vertical section portion 124 is lengthened or shortened, thereby adjusting the length of legs 14, 16, 17, and 18. Pin 130 may be inserted along the length of pin receiving area 128.

The melted raw plastic is then allowed to cool, mold core and mold cavity separated, and chair body 10 removed from the mold. Feet 20 may then be affixed to legs 14, 16, 17, and 18 of chair body 10.

In another embodiment, as shown in FIGS. 7 and 8, pin 130 is inserted through vertical section portion 124 until the desired pin receiving area is reached.

By placing pins 130 in selected pin receiving areas 128, a single mold 100 for a selected style of bar support may be used to manufacture multiple heights of chair body 10. Therefore, a manufacturer may eliminate capital expenditures for separate injection molds for each height, as well as costs involved in stopping the manufacturing process and changing out injection molds. The cost savings for a single style of bar support can be several millions of dollars.

While various embodiments have been shown and described, modifications thereof can be made by one skilled in the art without departing from the spirit and teachings of the disclosure. The embodiments described herein are exemplary only and are not intended to be limiting. Many variations and modifications of the subject matter disclosed herein are possible and are within the scope of the disclosure.

What is claimed is:

1. A mold for a rebar support chair, the rebar support chair comprising:

a chair body comprising a plurality of conjoined legs, the conjoined legs defining a receiving area; and a foot affixed to at least one leg, wherein at least one leg terminates in a leg pin and wherein a foot is affixed to the at least one leg pin, wherein the foot includes a receptacle configured to receive the leg pin, wherein the rebar support chair is made from a mold core comprising a plurality of pins, each pin located within a pin receiving area of a leg portion of the mold core and wherein the length of the leg is adjusted by selecting from the plurality of pins, wherein the mold comprises:

a mold cavity, the mold cavity including:

a receiving area portion and a plurality of leg portions, wherein the leg portions are in fluid communication with the receiving area portion, each of the leg portions, having a tapered section portion and a vertical section portion; and two or more pin receiving areas positioned within each vertical section portion; and the mold core.

2. The mold of claim 1, wherein the rebar support chair comprises a foot affixed to each leg.

3. The mold of claim 1, wherein each foot of the rebar support chair is affixed to each of the legs by friction fit, snap-fit, bayonet connection, adhesive, threads, or welding.

4. The mold of claim 1, wherein each foot of the rebar support chair is manufactured separately from the leg.

5. The mold of claim 1, wherein each foot of the rebar support chair includes one or more friction-increasing features.

6. The mold of claim 1, wherein the rebar support chair features comprise ridges, bosses or spikes.

7. The mold of claim 1, wherein each leg of the rebar support chair includes a tapered section and a vertical section.

8. A mold for a rebar support chair comprising:

a mold cavity, the mold cavity including: a receiving area portion and a plurality of leg portions, wherein the leg portions are in fluid communication with the receiving area portion, each of the leg portions having a tapered section portion and a vertical section portion; and two or more pin receiving areas positioned within each vertical section portion; and a mold core.

9. The mold of claim 8, further comprising a plurality of pins, each pin located within the pin receiving area of each of the leg portions.

* * * * *